United States Patent
Best

(10) Patent No.: US 6,386,294 B1
(45) Date of Patent: May 14, 2002

(54) HOLE MAKING SYSTEM

(76) Inventor: Warren R. Best, 1394 Minuet St., Henderson, NV (US) 89012

( * ) Notice: Subject to any disclaimer, the term of this patent is extended or adjusted under 35 U.S.C. 154(b) by 0 days.

(21) Appl. No.: 09/544,351

(22) Filed: Apr. 6, 2000

Related U.S. Application Data

(60) Provisional application No. 60/128,361, filed on Apr. 8, 1999.

(51) Int. Cl.$^7$ ................................................ A01B 45/00
(52) U.S. Cl. ........................... 172/22; 172/430; 175/20; 175/135; 30/316
(58) Field of Search .............................. 172/21, 22, 41, 172/42, 371, 374, 430, 19, 20; 294/50.7, 57; 30/280, 301, 315, 316; 175/20, 135; 173/126, 90

(56) References Cited

U.S. PATENT DOCUMENTS

| | | | |
|---|---|---|---|
| 3,210,112 A | * 10/1965 | Glynn | 172/22 |
| 3,273,930 A | * 9/1966 | Gottfried | 172/22 |
| 3,830,310 A | * 8/1974 | Williams | 172/22 |
| 3,889,761 A | * 6/1975 | Rogers | 172/706 |
| 4,566,543 A | * 1/1986 | Kotani | 172/4 |
| 4,585,072 A | * 4/1986 | Martinez | 172/22 |
| 4,750,565 A | * 6/1988 | Hansen et al. | 172/22 |
| 4,974,682 A | * 12/1990 | Hoffman | 172/22 |
| 5,469,923 A | * 11/1995 | Visser | 172/22 |
| 5,555,943 A | * 9/1996 | Blasczyk | 172/22 |
| 5,662,179 A | * 9/1997 | Falk | 175/20 |
| 5,937,953 A | * 8/1999 | Melberg et al. | 172/22 X |

FOREIGN PATENT DOCUMENTS

| | | | |
|---|---|---|---|
| GB | 856537 | * 12/1960 | 172/22 |
| GB | 1603992 | * 12/1981 | 172/22 |
| GB | 2144961 | * 3/1985 | |

* cited by examiner

*Primary Examiner*—Victor Batson
(74) *Attorney, Agent, or Firm*—Warren Best

(57) ABSTRACT

A hole making system for efficiently cutting a hole into a ground surface and for allowing effective removal of the plug. The inventive device includes a cutter assembly, a tamper assembly slidably positioned within the cutter assembly, and a hammer assembly slidably positioned about the tamper assembly for driving the cutter assembly into a ground surface. The tamper assembly includes a first depth indicator and a second depth indicator for indicating to the user the approximate depth of the hole being created. An alignment level is preferably positioned within a handle assembly of the tamper assembly for indicating to the operator the relative vertical alignment of the cutter assembly.

19 Claims, 3 Drawing Sheets

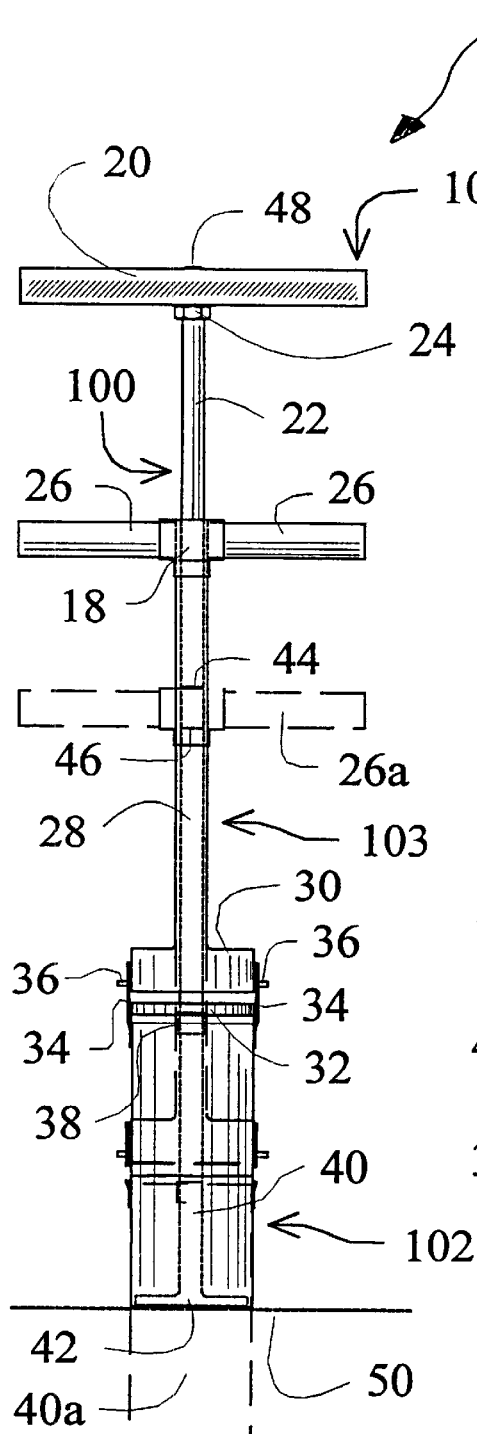
Fig. 2
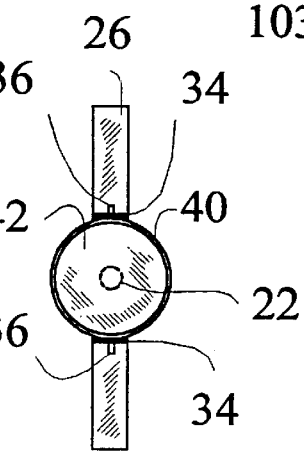
Fig. 3
Fig. 4
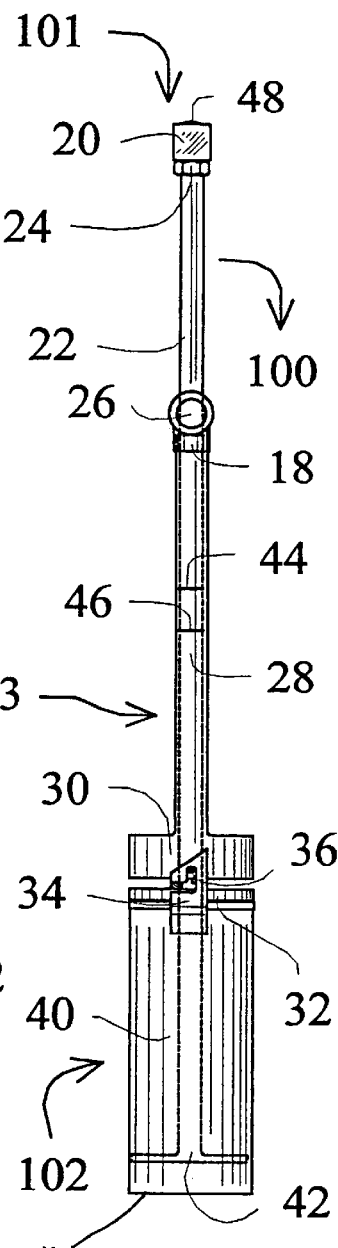
Fig. 5

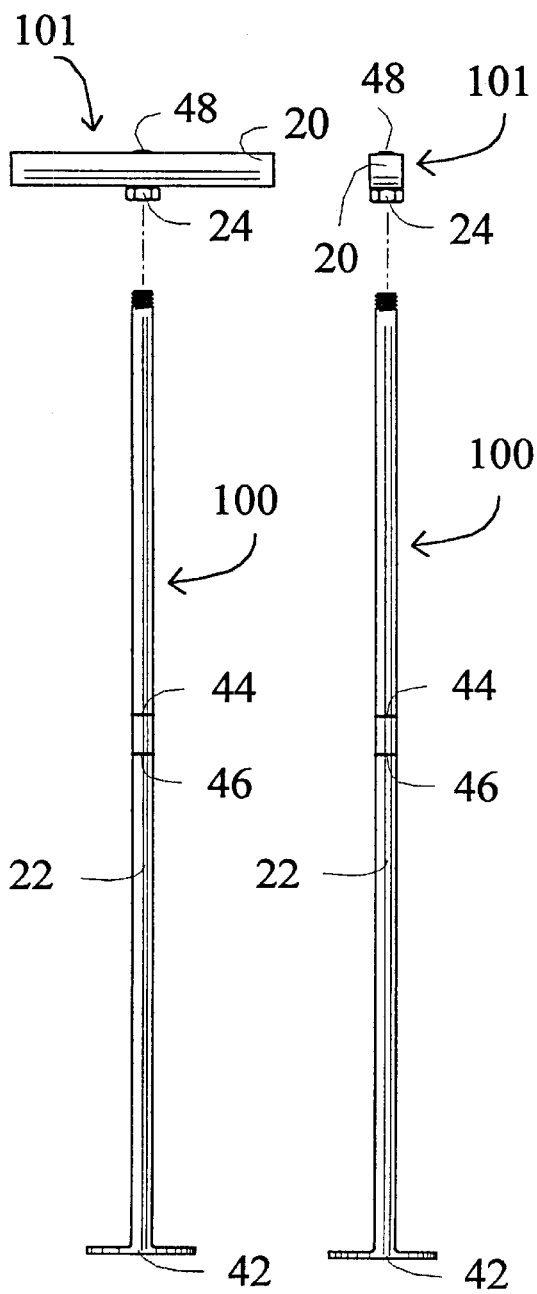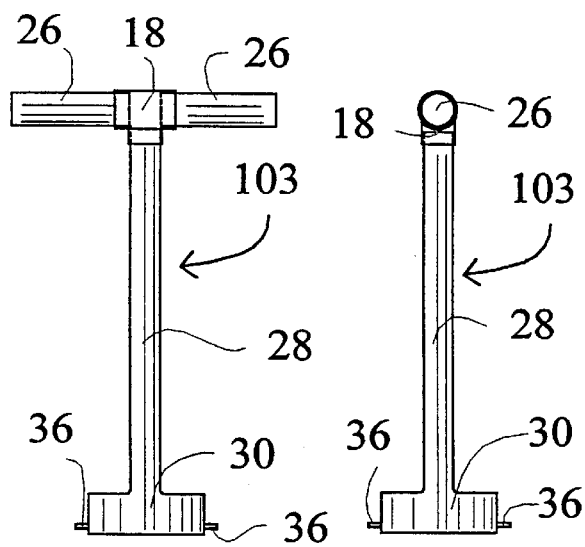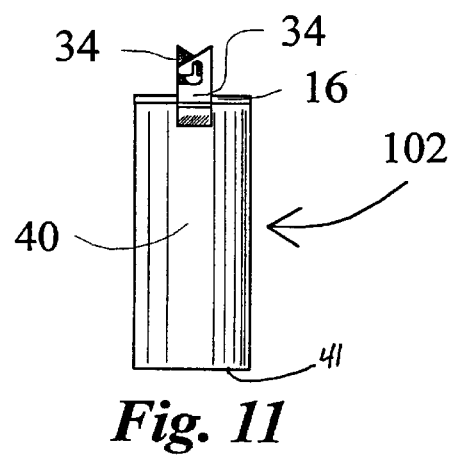
Fig. 6   Fig. 7   Fig. 8   Fig. 9   Fig. 10   Fig. 11

HOLE MAKING SYSTEM

CROSS REFERENCE TO A RELATED PATENT APPLICATION

This patent application is related to U.S. provisional application Ser. No. 60/128,361 filed on Apr. 8, 1999 with the named inventor being Warren Best. This application is currently pending with the United States Patent & Trademark Office.

BACKGROUND OF THE INVENTION

1. Field of the Invention

The present invention relates generally to hole cutting devices and more specifically it relates to a hole making system for efficiently cutting a hole into a ground surface and for allowing effective removal of the plug.

2. Description of the Prior Art

Hole cutting device have been in use for years. Typically, a hole cutter is comprised of a cylindrical blade with a handle attached to the top which requires the user to rotate and push into the ground surface often times severely damaging the plant growth. Conventional hole cutters are typically utilized by a greens keeper of a golf course for making the holes for the cup.

Conventional hole cutters also require a significant amount of force applied to them to effectively penetrate the ground surface. Also, conventional hole cutters do not provide an effective means for removing the plug of ground removed to make the hole.

While these devices may be suitable for the particular purpose to which they address, they are not as suitable for efficiently cutting a hole into a ground surface. Conventional hole cutters do not provide an easy to utilize means for making holes within a ground surface and require significant amounts of force applied to the cylindrical blade. In addition, conventional hole cutters often times damage surrounding vegetation growth.

In these respects, the hole making system according to the present invention substantially departs from the conventional concepts and designs of the prior art, and in so doing provides an apparatus primarily developed for the purpose of efficiently cutting a hole into a ground surface and for allowing effective removal of the plug.

SUMMARY OF THE INVENTION

In view of the foregoing disadvantages inherent in the known types of hole cutting device now present in the prior art, the present invention provides a new hole making system construction wherein the same can be utilized for efficiently cutting a hole into a ground surface and for allowing effective removal of the plug.

The general purpose of the present invention, which will be described subsequently in greater detail, is to provide a new hole making system that has many of the advantages of the hole cutting devices mentioned heretofore and many novel features that result in a new hole making system which is not anticipated, rendered obvious, suggested, or even implied by any of the prior art hole cutting devices, either alone or in any combination thereof.

To attain this, the present invention generally comprises a cutter assembly, a tamper assembly slidably positioned within the cutter assembly, and a hammer assembly slidably positioned about the tamper assembly for driving the cutter assembly into a ground surface. The tamper assembly includes a first depth indicator and a second depth indicator for indicating to the user the approximate depth of the hole being created. An alignment level is preferably positioned within a handle assembly of the tamper assembly for indicating to the operator the relative vertical alignment of the cutter assembly.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a hole making system that will overcome the shortcomings of the prior art devices.

A second object is to provide a hole making system for efficiently cutting a hole into a ground surface and for allowing effective removal of the plug.

Another object is to provide a hole making system that efficiently creates a hole within a ground surface or turf surface.

An additional object is to provide a hole making system that allows easy and simple removal of the plug of dirt removed to make the hole.

A further object is to provide a hole making system that reduces the amount of physical force required by a user to create a hole within a ground surface.

Another object is to provide a hole making system that insures that the hole will be properly aligned.

A further object is to provide a hole making system that cuts a true 4¼" cup in one piece.

An additional object is to provide a hole making system that significantly reduces high and low plugs.

Another object is to provide a hole making system that includes a built-in tamper to accurately set plugs in other holes.

A further object is to provide a hole making system that includes a circular level for insuring vertically aligned holes.

An additional object is to provide a hole making system that reduces the overall time required to create a hole within a surface of a golf green.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 2 is a front view of the present invention in operation.

FIG. 3 is a top view of the present invention showing the built-in level.

FIG. 4 is a bottom view of the present invention showing the cutting blade.

FIG. 5 is a side view of the present invention.

FIG. 6 is an exploded front view of the tamper.

FIG. 7 is an exploded side view of the tamper.

FIG. 8 is front view of the hammer assembly.

FIG. 9 is a side view of the hammer assembly.

FIG. 10 is a side view of the sound absorbing cushion.

FIG. 11 is a side view of the cutter cylinder.

DESCRIPTION OF THE PREFERRED EMBODIMENT

Figure 1:
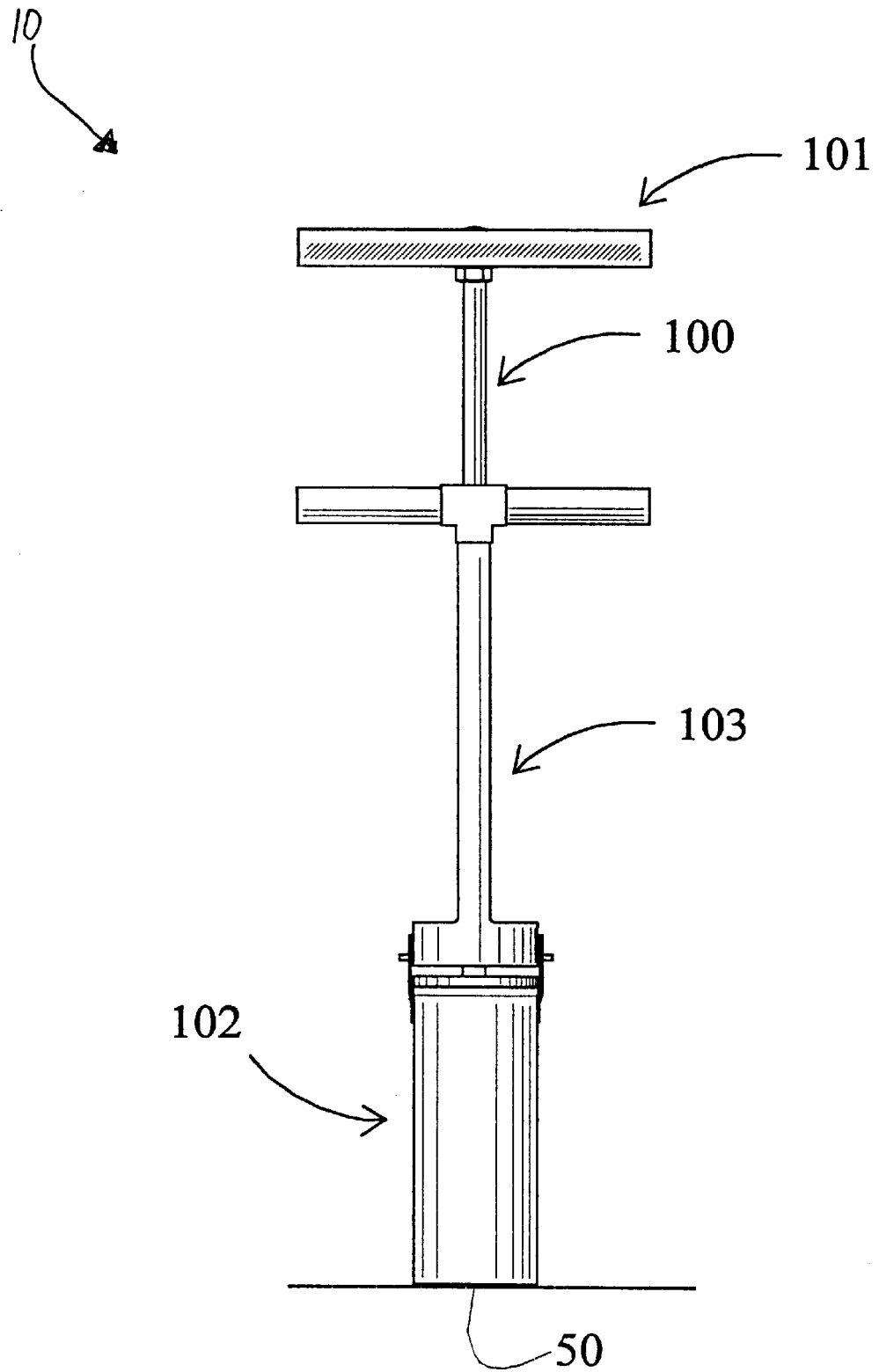
FIG. 1 is a front view of the present invention.

Turning now descriptively to the drawings, in which similar reference characters denote similar elements throughout the several views, FIGS. 1 through 11 illustrate a hole making system 10, which comprises a cutter assembly 102, a tamper assembly 100 slidably positioned within the cutter assembly 102, and a hammer assembly 103 slidably positioned about the tamper assembly 100 for driving the cutter assembly 102 into a ground surface 50. The tamper assembly 100 includes a first depth indicator 44 and a second depth indicator 46 for indicating to the user the approximate depth of the hole being created. An alignment level 48 is preferably positioned within a handle assembly 101 of the tamper assembly 100 for indicating to the operator the relative vertical alignment of the cutter assembly 102.

As shown in FIGS. 1, 2, 4, 5 and 11 of the drawings, the cutter assembly 102 generally comprises a cylindrical blade member 40. The blade member 40 has a lower cutting edge 41 which penetrates the ground surface 50 as shown in FIG. 2 of the drawings. The lower cutting edge 41 may have any structure commonly utilized for cutting edges.

The blade member 40 has at least one wall and may be constructed of any well-known rigid material. The blade member 40 preferably has a circular cross sectional area as best shown in FIG. 4 of the drawings. However, it can be appreciated that the blade member 40 may have various other cross sectional shapes not shown in the drawings. The blade member 40 has a height sufficient to receive the plug of turf removed from the ground surface 50 at various depths and heights.

As shown in FIG. 11 of the drawings, a plate member 16 encloses or partially encloses the end of the blade member 40 opposite of the cutting edge 41. The plate member 16 includes an aperture wherein a guide bushing 38 surrounds the aperture and is secured to the plate member 16 for guiding the shaft 22 during operation. A cushion member 32 is positioned adjacent the plate member 16 for absorbing a portion of the shock from the hammer assembly 103 and for reducing the noise emitted during operation of the hole making system 10. The cushion member 32 may be constructed of any well-known absorbent material such as rubber, foam, foam rubber, plastic or other similar material.

As shown in FIGS. 1, 2, 4, 5, 6 and 7 of the drawings, the tamper assembly 100 is comprised of a handle assembly 101 secured to a shaft 22 with a tamper plate 42 attached to the shaft 22 opposite of the handle assembly 101. The shaft 22 slidably extends through the aperture and the guide bushing 38 of the plate member 16 of the cutter assembly 102.

The handle assembly 101 is generally comprised of a tamper handle 20, an interiorly threaded member 24 attached to the middle portion of the tamper handle 20 and a level 48 attached to the tamper handle 20 opposite of the threaded member 24. The interiorly threaded member 24 is threadably engagable with the shaft 22 opposite of the tamper plate 42 as best shown in FIGS. 6 and 7 of the drawings.

The level 48 of the handle assembly 101 indicates to the operator the relative vertical alignment of the shaft 22 to insure a properly cut hole. A first depth indicator 44 is positioned upon the shaft 22 for indicating a first depth of the cutter assembly 102 as shown in FIGS. 6 and 7 of the drawings. A second depth indicator 46 is positioned upon the shaft 22 for indicating a second depth of the cutter assembly 102 as shown in FIGS. 6 and 7 of the drawings. As further shown in FIGS. 6 and 7 of the drawings, the second depth indicator 46 indicates a deeper hole than the first depth indicator 44.

As shown in FIGS. 1, 2, 5, 8 and 9 of the drawings, the hammer assembly 103 is generally comprised of a hammer handle 26, a sleeve 28 attached to the hammer handle 26, and a hammer head 30 secured to the sleeve 28 opposite of the hammer handle 26. The hammer assembly 103 is slidably positioned about the shaft 22 as best shown in FIG. 2 of the drawings. A T-member 18 is preferably positioned within the hammer handle 26, wherein the T-member 18 has an aperture aligned with the lumen of the sleeve 28 for allowing sliding upon the shaft 22. As shown in FIGS. 1, 2, 8 and 9 of the drawings, the hammer head 30 is preferably a broad structure having an outer perimeter similar in shape and size to the outer perimeter of the blade member 40. The hammer head 30 is preferably comprised of a heavy material for providing additional downward force upon the blade member 40 during operation.

As shown in FIGS. 1, 2, 4, 5 and 11 of the drawings, a plurality of hook members 34 are preferably attached to the blade member 40. As shown in FIGS. 1, 2, 4, 5, 8 and 9 of the drawings, a corresponding plurality of pin members 36 radially extend from the hammer head 30 for selectively engaging the hook members 34.

In use, the user positions the cutting edge 41 of the blade member 40 in the desired location upon the ground surface 50. The user then visually monitors the level 48 within the tamper handle 20 and adjusts the vertical alignment of the hole making system 10 accordingly until the blade member 40 is vertically aligned. The user then elevates the hammer assembly 103 upon the shaft 22 of the tamper assembly 100 and then allows the hammer assembly 103 to fall upon the cutter assembly 102. The hammer head 30 of the hammer assembly 103 directly engages the cushion member 32 which forces the blade member 40 into the ground surface 50. The user continues this process of elevating and dropping the hammer assembly 103 until the blade member 40 has penetrated the ground surface 50 a sufficient depth to support the hole making system 10. The user simultaneously monitors the level 48 and adjusts accordingly to insure that the blade member 40 is entering the ground surface 50 in a vertically aligned position. The user then grasps the hammer handle 26 elevating the hammer assembly 103 then forces the hammer assembly 103 downwardly upon the blade member 40 thereby driving the blade member 40 deeper into the ground surface 50. The user continues this process constantly monitoring the level 48 and monitoring the shaft 22 for the appropriate depth indicator 44, 46 to be exposed from the hammer assembly 103. After the appropriate depth indicator 44, 46 is exposed, the user terminates operating the hammer assembly 103 and then locks the pin members 36 within the hook members 34 thereby allowing the user to manipulate the hammer assembly 103 thereby rotating the blade member 40 to break the plug from within the ground. The user then removes the blade member 40 from the newly created hole and then inserts the appropriate cup. The user then positions the blade member 40 containing the plug within the older hole and then applies a downward force upon the tamper assembly 100 to push the plug from within the blade member 40 while simultaneously elevating the hammer assembly 103 and the blade member 40. The user continues this process until the plug has been completely removed from within the blade member 40 and is positioned firmly within the older hole. The user may utilize the tamper assembly 100 to manipulate the inserted plug to become flush with the surrounding ground surface 50. The user may then repeat the above process for additional greens.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

ENVIRONMENTAL ELEMENTS

10. Hole Making System
11.
12.
13.
14.
15.
16. Plate Member
17.
18. T-Member
19.
20. Tamper Handle
21.
22. Shaft
23.
24. Threaded Member
25.
26. Hammer Handle
27.
28. Sleeve
29.
30. Hammer Head
31.
32. Cushion Member
33.
34. Hook Members
35.
36. Pin Members
37.
38. Guide Bushing
39.
40. Blade Member
41. Cutting Edge
42. Tamper Plate
43.
44. First Depth Indicator
45.
46. Second Depth Indicator
47.
48. Level
49.
50. Ground Surface
51.
52.
53.
54.
55.
56.
57.
58.
59.
60.
61.
62.
63.
64.
65.
66.
67.
68.
69.
100. Tamper Assembly
101. Handle Assembly
102. Cutter Assembly
103. Hammer Assembly
104.
105.
106.
107.
108.
109.

I claim:

1. A hole making system, comprising: a blade member having a tubular structure and a cutting edge; and a plate member connected to said blade member opposite of said cutting edge; a shaft extending through said plate member; a hammer assembly slidably positioned upon said shaft for engaging and driving said blade member into a ground surface; a cushion member positioned between said plate member and said hammer assembly; and a handle assembly positioned at the top of said shaft.

2. The hole making system of claim 1, wherein said hammer assembly comprises; a shaft extending through said plate member; and a hammer assembly slidably positioned upon said shaft for engaging and driving said blade member.

3. The hole making system of claim 2, wherein said hammer assembly comprises; a sleeve slidably positioned upon said shaft; and a hammer head comprising of a plurality of pin members radially extending from said hammer head which is secured to a lower portion of said sleeve and slidably positioned upon said shaft.

4. The hole making system of claim 3, wherein said hammer assembly further includes a handle secured to said sleeve opposite of said hammer head.

5. The hole making system of claim 4, wherein said hammer head has a broad structure formed to a shape similar to said blade member.

6. The hole making system of claim 5. Including a cushion member positioned between said hammer head and said plate member.

7. The hole making system of claim 1, including a cushion member positioned between said hammer assembly and said blade member.

8. The hole making system of claim 1, wherein said blade member has a circular cross sectional shape.

9. The hole making system of claim 2, wherein said shaft includes at least one depth indicator in the form of a line traveling the circumference of said shaft.

10. The hole making system of claim 1, including a locking assembly for locking the vertical and rotational positions of said hammer assembly and said blade member with respect to one another.

11. A hole making system, comprising: a blade member having a tubular structure, a cutting edge, and a plate member connected to said blade member opposite of said cutting edge; a tamper assembly having a shaft slidably extending through said plate member of said blade member, wherin said shaft includes an engaging end for engaging a plug within said blade member; a hammer assembly slidably positioned upon said tamper assembly for driving said blade member into a ground surface;

and a cushion member positioned between said hammer assembly and said blade member.

12. The hole making system of claim 11, wherin said hammer assembly comprises: a sleeve slidably positioned upon said shaft of said tamper assembly; and a hammer head secured to a lower portion of said sleeve and slidably positioned upon said shaft.

13. The hole making system of claim 12, wherein said hammer assembly further includes a handle secured to said sleeve opposite of said hammer head.

14. The hole making system of claim 13, wherein said hammer head has a broad structure formed to a shape similar to said blade member.

15. The hole making system of claim 14, including a cushion member positioned between said hammer head and said plate member.

16. The hole making system of claim 11, wherein said engaging end of said shaft is comprised of a tamper plate.

17. The hole making system of claim 11, wherein said shaft includes at least one depth indicator.

18. The hole making system of claim 11, including a plurality of hook members secured to said blade member and a corresponding plurality of pin members extending from said hammer head, wherein said plurality of pin members are lockable within said plurality of hook members for locking a vertical position and a rotational position of said hammer assembly with respect to said blade member.

19. A hole making system comprising: a blade member having a tubular structure, a cutting edge, and a plate member opposite of said cutting edge; a tamper assembly comprising a shaft slidably extending through said plate member of said blade member, a tamper plate positioned within a lumen of said blade member, a tamper handle secured to said shaft opposite of said tamper plate, and at least one depth indicator upon said shaft; and a hammer assembly comprising a sleeve slidably positioned about said shaft between said tamper handle and said blade member, a driving handle secured to said sleeve, and a hammer head secured to said sleeve opposite of said driving handle and in opposition to said blade member; a plurality of hook members secured to said blade member; a plurality of pin members radially extending from said hammer head, wherein said plurality of pin members are selectively engagable within said plurality of hook members; a level secured within said tamper handle for indicating a vertical alignment of said blade member; and a cushion member positioned between said hammer head and said plate member of said blade member.

* * * * *